June 9, 1931.  G. H. HINES  1,809,412
FLEXIBLE AUTOMATIC TRANSMISSION
Filed Oct. 13, 1930   3 Sheets-Sheet 1

June 9, 1931. G. H. HINES 1,809,412
FLEXIBLE AUTOMATIC TRANSMISSION
Filed Oct. 13, 1930 3 Sheets-Sheet 2

Gail H. Hines,
INVENTOR.

June 9, 1931.  G. H. HINES  1,809,412
FLEXIBLE AUTOMATIC TRANSMISSION
Filed Oct. 13, 1930  3 Sheets-Sheet 3

Gail H. Hines,
INVENTOR.

Patented June 9, 1931

1,809,412

UNITED STATES PATENT OFFICE.

GAIL H. HINES, OF LANSING, MICHIGAN

FLEXIBLE AUTOMATIC TRANSMISSION

Application filed October 13, 1930. Serial No. 488,411.

The invention relates to power transmission, and particularly to the connection between a driving element such as the crankshaft of an ordinary automobile motor and a driven member such as the load shaft in positive driving relation with the rear wheels of an automotive vehicle, whereby the speed of the driven member may be varied automatically from that of the driving element in a gradually rising ratio as distinguished from a step by step ratio.

By the invention also the speed relation between the driving and driven members is changed automatically not only by variations in the load, but also by variations in the speed of the driven member to conform to that of greatest efficiency under the resistance torque conditions existing at the time.

The invention is essentially comprised of a differential planetary gear-assembly including smoothly operating internal gears, of a mechanism to prevent retrograde rotation of the planet-gear carrier, and of a torque controlled, centrifugally governed controlling apparatus for automatically varying the multiplication of the driving torque by variably supporting the gear fulcrum with excess motor-power available according to the speed and torque conditions existing at the time.

Moreover, under abnormal conditions, as where traction is poor and the resistance of the load at high speed is practically nil, provision is made for manually broadening the transmission ratio to a point corresponding to the greatest traction efficiency under the existing conditions; however it will be obvious that in my device the relation of the torque control mechanism and the speed control mechanism is such that a resort to the foregoing emergency provision is practically unnecessary.

Furthermore, the last mentioned manual control is adapted to be employed as a braking mechanism when it is desired to descend a steep incline with the device locked into low or slow gear instead of high or fast gear which would normally be effected.

While the invention is particularly applicable to a motor vehicle and is hereinafter described in that connection, its field of usefulness is not thus limited, but includes power transmission generally, as in machine tools, where it is desirable to translate substantially constant speed of a main drive into variable speeds at the machine and automatically to vary the ratio of transmission to maintain the highest efficiency at the point of application.

In general it is my aim to set forth these and certain other improvements and refinements which I have invented to elaborate upon the particular devices set forth in my Letters Patent No. 1,678,595, granted July 24, 1928, and No. 1,681,613, granted August 21, 1928, on power-control devices, No. 1,768,839, granted July 1, 1930, and No. 1,771,040, granted July 22, 1930, on flexible automatic transmissions, to which I refer you for more complete information regarding the basic idea upon which are made the improvements herein set forth, and in which previous Letters Patent some of the mechanisms herein shown employed are illustrated more in detail.

Furthermore, the basic novelty is substantially the same as disclosed in my application for Letters Patent on flexible automatic transmissions filed March 28, 1929, and having Serial No. 350,654; and it will be understood that a mechanism shown employed in any one of the above references to accomplish a particular result may be substituted for a similar mechanism employed in any other of my inventions, and therefore, in the following description I may describe only in general terms some mechanisms which are set forth more in detail in the aforesaid references.

Figures 1, 5:
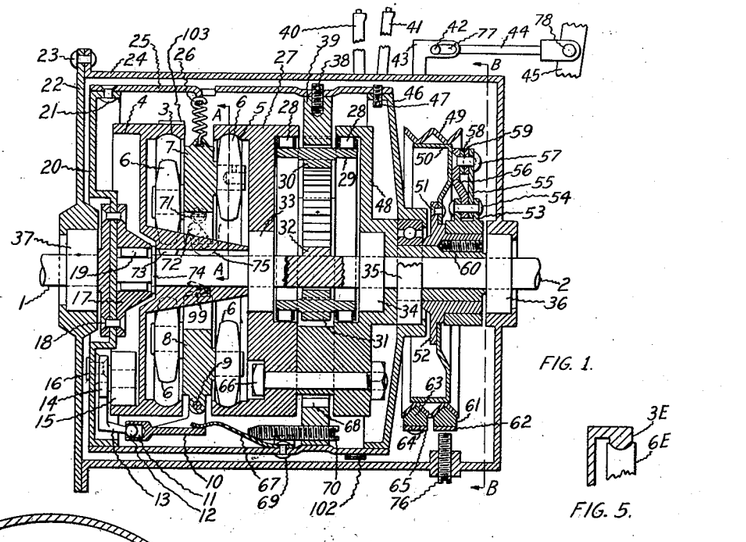
Figure 1 is a side elevational view, in part a side elevation and in part a vertical section showing one embodiment of my invention employing gearing which may be quite readily made from the present facilities for manufacture.
Fig. 5 is a fragmentary sectional view showing how a rotary ridge may be formed internally of the cams to fit grooved rollers.

Moreover, the particular type of planetary gearing which I show in Fig. 1 of the drawings as being suitable for use in my improved device is illustrated more in detail in the United States patent to W. I. Wheeler, No. 1,695,356 of December 18, 1928.

The annexed drawings and the following description set forth in detail certain mechanisms embodying the invention, such disclosed means constituting, however, but few of the various mechanical forms in which the principle of the invention may be used.

In said annexed drawings.

Figures 2, 3, 4:
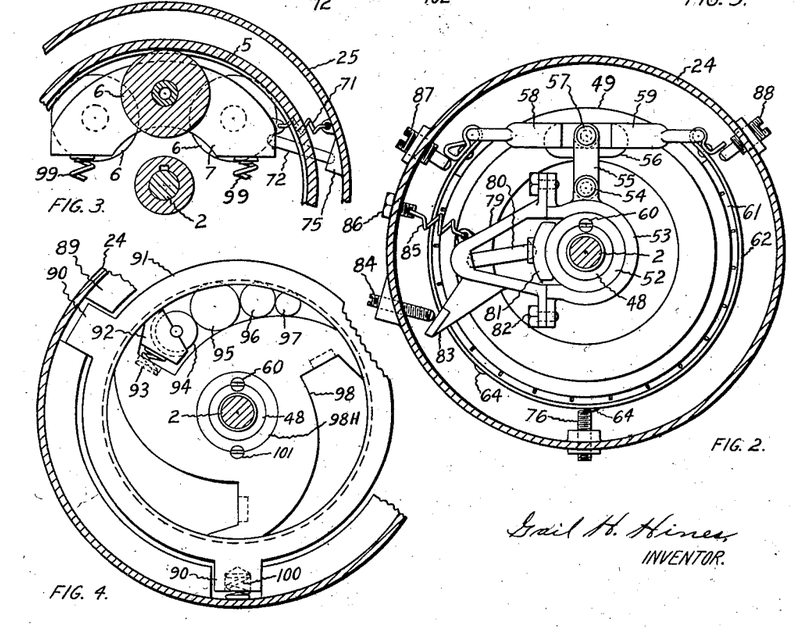
Fig. 2 is a sectional view taken on line B—B of Fig. 1.
Fig. 3 is a fragmentary sectional view taken on line A—A of Fig. 1 modified to show the use of springs 99 under compression between the centrifugal weights in lieu of the springs 26 and 67.
Fig. 4 is a fragmentary sectional view showing an equivalent mechanism for automatically preventing retrograde rotation of the planet-gear carrier to be substituted in the device for the mechanism shown in Fig. 2 of the drawings.

Referring to Figs. 1, 2 and 3 in the drawings, shafts 1 and 2 are journaled in alignment for relative rotation, one to the other, in the case comprised of the case elements 22 and 24 secured together by rivets 23. A driven member comprised of the cylinder 25, the discs 20 and 46, the internal ring-gear 39, the shaft 1, and the roller-bearing outer-race 17, has its cylinder fixed to the discs 20 and 46 by means of rivets 21 and screws 47 and is journaled for rotation on ball bearing assemblies 37 and 35. The shaft 1, the bearing-race 17, and the disc 20 are secured together by rivets 18. The internal ring-gear 39 is fixed to the cylinder 25 of the driven member by means of screws 38. A drive member includes the shaft 2 and the spur gear 32 formed integral with the shaft 2 and is journaled for rotation on a roller-bearing assembly 19 near its rear extremity and a ball-bearing assembly 36 which is located in the front wall of the case element 24.

A planet-gear carrier comprised of the elements 27 and 48, and bolts 66, is journaled for rotation on the drive shaft 2 on the bearing assemblies 33 and 34 and is free to rotate relative to the drive shaft 2 and the driven shaft 1. A planet ring-gear 29 is journaled in the carrier on roller bearing assemblies 28 on an axis which is free to revolve about the axis of the drive and driven shafts. The planet ring-gear has internal teeth 30 in mesh with the drive gear 32 and also has external teeth 31 in mesh with the driven internal ring-gear 39. An internal cam 5 with a rotary elliptical groove is formed with the planet-gear carrier element 27. Another internal cam 3 having a rotary elliptical groove is fixed to the drive shaft 2 by means of the key 73 and is located rearwardly of the cam 5. Suitable space is provided between the cams 5 and 3 to receive centrifugally operating weights 7 and 8, the weights being carried on rollers 6 which are journaled for rotation on suitable shaft-like portions of the weights. The peripheral surfaces of the rollers 6 are formed to fit the rotary grooves of the cams 5 and 3.

A third internal elliptical cam 4 is formed integral with the cam 3 and has its face disposed rearwardly of the cam 3. In rolling contact with the cam 4 is a roller 15 which is journaled for rotation on a shaft-like portion of a third centrifugally operating weight 14. The weight 14 is hinged near one of its extremities on a pin 16 so as to have positive connection with the driven shaft 1 and yet have its opposite extremity which carries the roller 15 free to be moved against centrifugal resistance when the roller 15 rolls on the cam 4. An arm 13 is fixed to the weight 14 and projects radially outward and forward and is shaped sufficiently spherical at its outward end to serve in a ball-and-socket joint connection with a cylindrical formation disposed at the rear corner of a somewhat triangular connecting link 10 which has ears formed on its front corners turned radially inward, the ears being astride a third ear which projects radially outward from the weight 8. A pin 9 passes through the ears forming a hinge joint between the weight 8 and the connecting link 10. A cantilever spring 67 is fixed at its forward extremity to the cylinder 25 of the driven member by means of rivets 69 so that it cannot move sidewise relative to the cylinder 25. The free end of the spring 67 bears against the inner surface of the link 10 and its width spans the space between the ears on the front corners of the link 10 so as to positively connect the weight 8 to the driven shaft 1 and yet leave the weight 8 free to be moved somewhat radially inward against centrifugal resistance while the spring 67 forces the weight 8 and its rollers 6 outward against the cams 5 and 3. A helical spring 26 is under tension joining the weight 7 to the cylinder 25 so as to force the weight 7 and its rollers 6 outward against the cams 5 and 3. A push rod 72 has one of its ends joined in a ball-and-socket joint with the weight 7 and its other end joined in a ball-and-socket joint with the cylinder 25 in a boss 75 formed integral with the cylinder. The push rod 72 may join the weight 7 and the cylinder 25 in non-separating joints or, as I have shown, a spring 71 may connect the weight 7 with the cylinder 25 so as to constantly hold the push rod 72 under compression. It is preferable to have the push rod 25 disposed so as to form an angle of less than ninety degrees with the axis of the drive shaft 2, the angle being sufficiently acute to suitably minimize the side draft or twisting effect on the weight 7 caused from the action of the cams 3 and 5.

The cantilever spring 67 bears against a tension-adjusting screw 70 which is threaded through the internal driven gear 39 so as to adjust the tension of the spring 67, the screw 70 being suitably flatted for contact with the spring so as to maintain the adjustment.

The element 48 of the planet-gear carrier has a sleeve-like projection which extends forward and terminates in a shoulder for the inner race of the ball-bearing assembly 36. Upon the sleeve-like projection of the element 48 is fixed a hub 52 of a brake drum 50 which has a grooved rim 49 welded to be an integral part thereof. The drum 50 is secured to the hub 52 by means of rivets 51. The screw 60 is employed to fix the hub 52 securely attached to the planet-gear carrier. Upon the longest peripheral surface of the hub 52 is mounted a collar 53 within which the hub 52 is normally free to rotate relative to the collar. A clutch shoe 81 is also in sliding contact with the longest peripheral surface of the hub 52 and formed and disposed somewhat as a free and detached segment of the collar 53. Arched over the shoe 81 is a bracket 79 which is attached to the collar 53 by means of screws 82. Sockets are formed in the bracket 79 and shoe 81 disposed so as to hold a push rod which has ends formed partially spherical and suitable to fit the socket in the bracket 79 and the socket in the shoe 81, and the push rod 80 is of a suitable length and disposition to cause the shoe and collar to tighten onto the hub 52 when the rotation of the hub 52 is counter-clockwise relative to the case 24. A brake band 62 for clutching onto the rim 49 of the drum 50 is lined with some quite durable friction lining 61 which may be die-cast with studs 64 integral therewith to be headed over for riveting the lining 61 to the band 62. The band 62 is locked with the case 24 by means of the screws 87 and 88 which are threaded through the case 24. Toggle links 58 and 59 join the ends of the band 62 and the toggle links are joined to the collar 53 by means of the connecting links 55 and 56. The inner ends of the links 55 and 56 join the collar 53 in a hinge joint on the pin 54 which passes through ears projecting from the collar 53. The outer ends of the links 55 and 56 are hinged on the pin 57 which passes through the toggle links 58 and 59. The link 56 has sliding contact with the front face of the drum 50 for holding the toggle links 58 and 59 in suitable alignment. The screw 76 is adjustable for limiting the downward movement of the band 62. The screw 84 is threaded through the case 24 and limits the swinging movement of the arm 83 which is integral with the bracket 79. The spring 85 joins the case 24 to the bracket 79 so as to normally force the arm 83 against the screw 84, the outer end of the spring 85 being hooked into a screw 86 which is threaded through the case 24.

The band 65 is lined with friction lining 63 and is quite similar to the band 62; however, the band 65 is manually operable from the levers 41 and 43, connections between the band and the levers being shown more in detail in references hereinbefore mentioned. The lever 43 has an elongated slot 77 which permits a limited free movement of the connecting rod 44 whereas the latter possesses a laterally projecting stud 42 which is movable within the slot 77 to an extent permitting the motor clutch pedal 45 to be moved forward far enough to disengage the motor power from the drive shaft 2 before pressure on the pedal 45 begins to actuate the lever 43, the rod 44 being hinged to the clutch pedal 45 on the pin 78.

In lieu of the springs 67 and 26 I may employ compression springs 99 spanning the space between the weights 7 and 8 for the purpose of holding them in operative relation with the cams 3 and 5 and to cause the weights to be moved against spring pressure, the springs 99 being especially shown in Figure 3 of the drawings.

As shown in my Patent No. 1,768,839, a reverse mechanism may be attached at the rear of the device in which neutral may be had in the usual way by shifting a lever. If a second reduction gear is employed in combination with the reverse unit very great multiplication of power may be provided for use in trucks and busses, a lever being employed to shift from great power to great speed, the automatic variation being effective in either shift.

The principle and operation of the invention is very much the same as described in my Patents No. 1,768,839 and No. 1,771,040. However, I may briefly review the operation. Therefore let us consider the device as being installed in an automobile with the drive shaft 2 clutched to the motor crankshaft in the ordinary manner, an ordinary friction clutch being employed for engaging the power. The drive shaft 2 rotates at crankshaft speed and drives the driven shaft 1 through the gears 32, 29 and 39 so that the driven shaft 1 is rotated at a reduction. The resistance torque tends to cause the planet-gear carrier 27 to rotate counter-clockwise, but this retrograde rotation is prevented by the clutching of the band 62 onto the drum 50. A very slight retrograde rotation of the hub 51 causes the shoe 81 to bear forcibly against the hub and cause the collar 53 to also tighten onto the hub; then the toggle links 58 and 59 are actuated whereas the band 62 is clutched onto the drum 50 locking the carrier 27 to the case 24.

The weights 7, 8, and 14 are revolved the same number of revolutions per minute as the number of rotations per minute of the driven shaft 1, then as the vehicle gains speed the rollers 6 and 15 are more strongly forced against the cams 3, 5, and 4 causing part of the motor power to be delivered somewhat directly to the driven shaft 1 which is connected to the rear wheels of the vehicle in the ordinary way through the rear axle gearing. The cams 3 and 4 rotating at crankshaft speed rotate faster than the revolution of the weights 7, 8, and 14. The action of the cams 3 and 4 causes the weights to revolve faster as the resistance torque decreases, and the action of the cam 5 on the weights 7 and 8 causes the carrier 27 to be impelled into faster rotation and simultaneously cause the gear 29 to rotate more slowly as its speed of revolution increases; then the speed of the car having increased, the centrifugally operating weights bear their rollers more forcibly against the respective cams until the whole assembly on the shafts 2 and 1 rotates as a flywheel at crankshaft speed and ultimate direct driven is effected.

By actuating the clutch foot pedal 45 the band 65 may be temporarily clutched to the drum 50 to lock the latter to the case 24 or the hand lever 41 may have operative connection with the band 65 to lock the device into ultimate low gear for use in braking a vehicle while descending steep inclines.

In any ordinary manner the band 102 may be operatively connected to the lever 40 for use in braking the driven shaft 1.

As shown in Figure 3 of the drawings I prefer to use each weight 7 and 8 carried on three rollers, having two rollers of each weight in rolling contact with the cam 3 and the third roller in contact with the cam 5; however this relation may be reversed so as to have two rollers of each weight 7 and 8 in contact with the cam 5 and the third in contact with the cam 3.

The tension in the springs 99 should be relatively strong to provide a constant torque control which is substantially added do the variable centrifugal pressure generated in the weights. By using relatively strong springs 99 to support the weights the device will function in high gear at slow speed when the resistance torque is low.

The internal cams are preferably elliptical; however, they may be easily made by separating two semi-annular parts of each cam element from the center distorting the true circle so as to most smoothly and effectively work the weights.

The relation of the weights, the cams, and the springs should be such as to most effectively use the excess motor power for variably supporting the planet-gear carrier. Considering the gearing as a lever and the planet-gear carrier as the fulcrum it should not be difficult to understand that the fulcrum is variably supported by excess motor power as fast as the lessening of the resistance torque makes the excess power available, and that in intermediate ratios part of the power is applied somewhat directly to the driven shaft 1 while forcing the fulcrum forward at the same time that part of the power is multiplied through the gearing while prying against some excess power which is made available by opening the motor throttle.

In Figure 4 of the drawings I have illustrated an equivalent mechanism for preventing retrograde rotation of the gear carrier 27. An annular outer race 91 for the rollers 95, 96 and 97 possess lugs 90 which correspond with notches formed in arcuate flanges 89 which are formed integral with the case 24. In a lower lug 90 is a recess which contains a spring 100 which bears with the case 24 so as to minimize the weight of the race 91 on the rollers 95, 96 and 97. An inner race 98 is fixed to the carrier element 48 by means of a screw 101 which fixes the race 98 to a brake-drum hub 98H which is in turn fixed to the carrier element 48. Three arcuate wedge-like recesses are formed between the races 98 and 91. In the recesses are contained the rollers 95, 96 and 97 of different diameters suitable to fit the recesses and be wedged when the carrier 27 tends to rotate counter-clockwise and to roll freely when the carrier 27 rotates in a clockwise direction. A spring 93, a roller 94, and a holder 92 are employed in each recess to hold the rollers 95, 96 and 97 suitably in operative positions.

As illustrated in Figure 5 of the drawings, each cam may be ridged as shown at 3E and each roller may be grooved as the roller 6E in lieu of having grooves formed in the cams.

Figures 6, 7, 8, 9, 10, 11, 12, 13, 14:
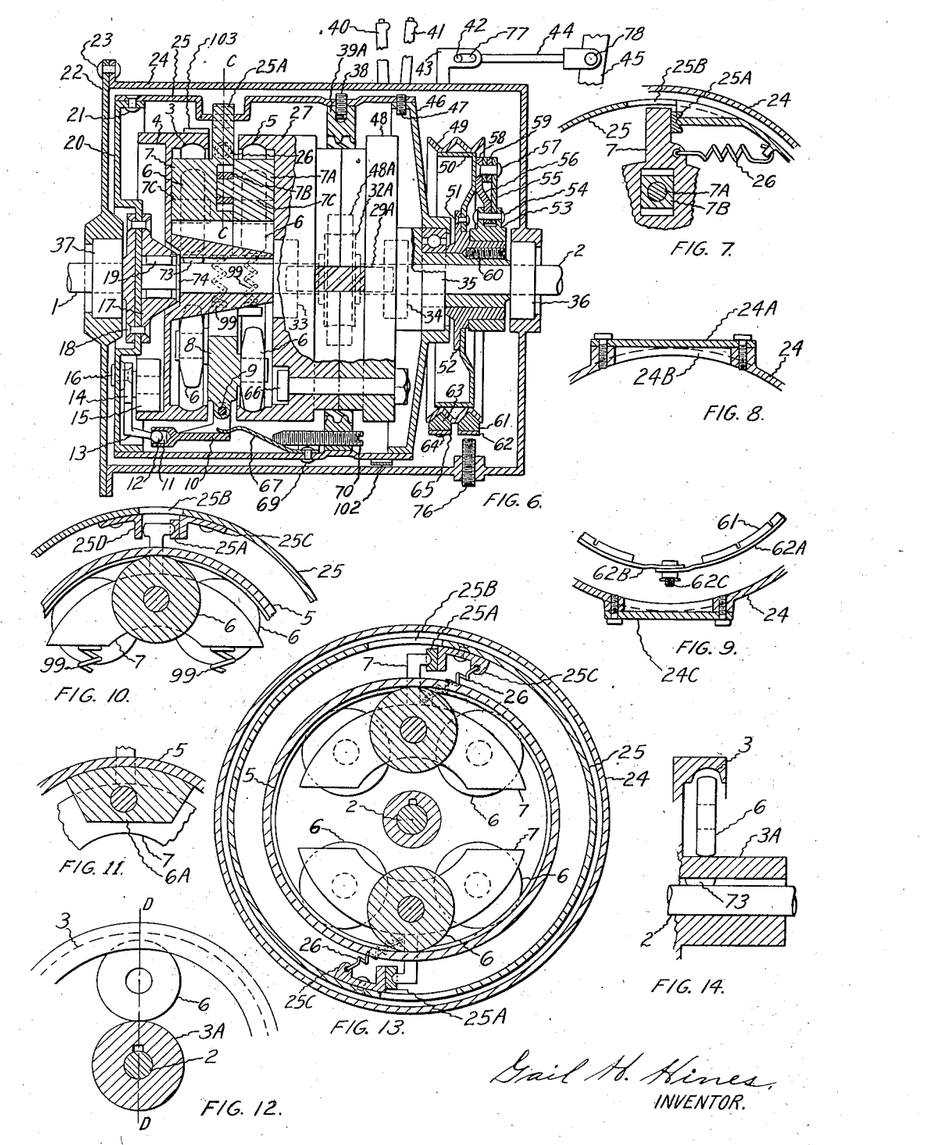
Fig. 6 is a side elevational view, in part a side elevation and in part a vertical section showing one embodiment of my invention featuring all claims hereto annexed.
Fig. 7 is a fragmentary sectional view taken on line C—C of Fig. 6.
Fig. 8 is a fragmentary sectional view showing how a hand-hole cover 24A may be fitted over a hand-hole 24B of the case 24 so that the cover may be easily removed for making repairs and adjustments.
Fig. 9 is a fragmentary sectional view showing a brake band in two parts 62A and 62B which are secured together by the bolt 62C, the latter being accessible by removing the hand-hole cover 24C of the case 24.
Fig. 10 is a fragmentary sectional view showing a construction in which all springs for holding the centrifugal weights in place are omitted except the springs 99, the elements 25A, 25C and 25D being associated with the stud formation of each weight 7 so as to maintain proper working relations.
Fig. 11 is a fragmentary sectional view showing the use of shoes 6A in lieu of the rollers 6.
Fig. 12 is a fragmentary sectional view showing a relation of rollers 6, cam groove 3 and cam hub 3A so that the centrifugal weights will throw into working relation as the device comes into operation with its inherent centrifugal pressure.
Fig. 13 is a fragmentary sectional view showing the use of diametrically opposed centrifugal weights 7 which are held in operative relation by the springs 26, the bearing blocks 25A having sliding contact with the elements 25C of the driven member 25, a ball-and-socket connection being had between each weight 7 and each bearing block 25A.
Fig. 14 is a fragmentary sectional view taken on line D—D of Fig. 12.
Figure 17:
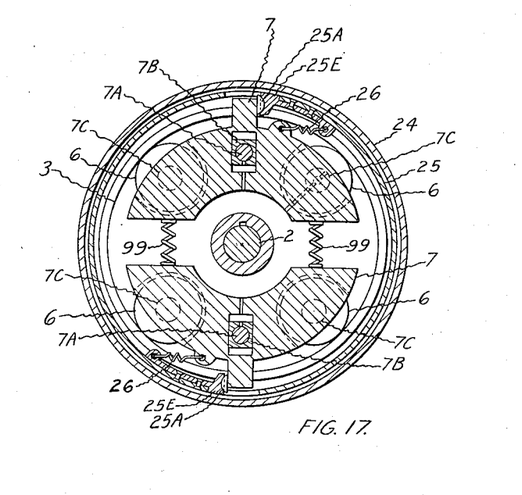
Fig. 17 is a fragmentary sectional view taken on line F—F of Fig. 15.

Instead of employing one integrally formed centrifugal weight 7 carried upon three rollers 6, I may have the weight formed from two distinct elements locked together in any ordinary manner so that the elements will have relative out-and-in movement, one to the other, yet so locked that the two elements of the weight 7 shall revolve together, one of the elements being carried upon two rollers which are in rolling contact with the cam 3, and the other element being carried upon two rollers which are in rolling contact with the cam 5, the first element being guided in its out-and-in movement between the vertical wall of the cam 5 and the second element, the second element being similarly guided between the first element and the wall of the cam 3, and one of the elements having positive connection with the driven element 25. And it will be noted that this construction is particularly advisable when it is desired to provide most effective centrifugally operating weight in small space while for further compactness in the complete device I may use it in combination with the spiral planetary gearing shown in hereinbefore mentioned references together with one of the simpler means for preventing retrograde rotation of the planet-gear carrier. While I have shown in Fig. 1 of the drawings a type of gearing which is more readily adaptable to the present facilities for manufacturing I anticipate that industry will prepare itself to meet the growing demand for more quietness and smoothness of operation in a device of this kind regardless of increased initial expense; therefore, in Fig. 6 of the drawings I show the use of spiral planetary gearing wherein I employ a drive gear 32A, a driven gear 39A, and planet-gears 29A, the latter being carried for rotation on shafts 48A and being in mesh with both the drive gear and the driven gear. Also Fig. 6 illustrates a manner of resolving each centrifugal weight into major component elements 7 and 7A, these relatively moving elements being operatively connected by the bearing block 7B which is carried on a shaftlike portion of the element 7A and is slidable in a suitably formed recess in the element 7, the rollers 6 being carried for rotation on shafts 7C as is shown in Fig. 17 of the drawings. The bearing block 25A has sliding relation with the element 7 and rocking relation relative to the indented formation of the driven element 25. Two pairs of springs 99 contact with the weight 8 while one pair is in contact with the element 7, and the other pair is in contact with the element 7A.

One of the old and simple means for preventing retrograde rotation of the planet-gear carrier is a roller (or ball) disposed so as to be wedged between said carrier and the case, the roller automatically freeing when clockwise rotation is effected.

As shown in Fig. 1 of the drawings, fins 103 may be formed on the periphery of the cam 3 adjacent to the extremities of the minor axis to throw oil over the mechanism, and the fins will be formed at a suitable angle to be most effective in throwing oil forward over the gearing. Such fins may be formed integral with the cam or they may be formed as separate elements attached to the cam in any ordinary manner.

I may employ both a spiral planet gear and a planet ring gear having two series of teeth, whereas I may use two drive pinions and a driven gear having correspondingly two series of teeth.

Figure 15:
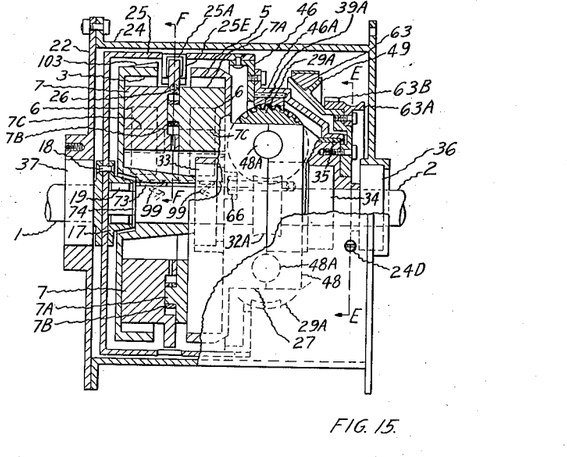
Fig. 15 shows a compact embodiment of my device suggesting one of its most practical forms.
Figure 16:
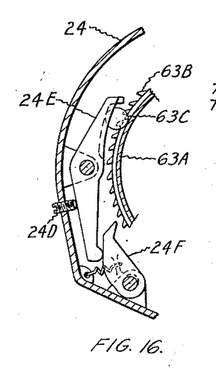
Fig. 16 is a fragmentary sectional view taken on line E—E of Fig. 15.

In Figure 1 of the drawings I have shown mechanism with a quantity and variety of elements and arrangements which might be redundant for ordinary purposes and elaborate enough for a most special condition, and I wish it to be understood that I may have a perfect working device with many of the elements omitted from the invention as illustrated, and I may use a plurality of any single element employed in the same manner where such a plurality of elements will maintain a more perfect balance of the mechanism or otherwise render the device more effective such as the use of diametrically opposed elements as is shown in Fig. 13 of the drawings, or I may use other obvious arrangements of elements. For example I may use two or more of the weights 7 in lieu of the weights 8 and 14 such as the use of diametrically opposed weights 7 as is shown in Fig. 13; I may use two of the springs 26 in lieu of the spring 67 (Fig. 10); I may omit the springs 67 and 67 (Fig. 10); I may omit the springs 67 and 26, and for the purpose of holding weights in place under spring pressure I may employ only the springs 99; I may somewhat shorten the device by using a larger bearing assembly 35 and having its inner race fitted with the next larger peripheral surface of the element 48 (Fig. 15); I may omit the rivets 21 and have the element 20 formed integral with element 25 (Fig. 25); I may have a hand hole with a removable cover over the bands 62 and 64 suitable for easily removing the bands for making repairs (Fig. 8); suitable hand holes may be formed in any of the elements for the purpose of facilitating assembling and making adjustments (Fig. 7 at 25B); the bands 62 and 64 may each be made in two parts bolted together so as to be easily separated and removed from a hand hole at the bottom of the case 24 (Fig. 9); I may employ shoes in sliding contact with the cams 3 and 5 in lieu of the rollers 6 (Fig. 11); and I might suggest other obvious simplifications and arrangements for carrying out the principle of my invention, yet I deem the above suggestions sufficient to suggest the other obvious arrangements most suitable for the particular condition under which the device is to be used, whereas for a particular condition I may omit all of the springs 26, 67, 71 and 99 from the device and have the hub of the cam 3 formed suitably large to prevent the rollers 6 from becoming inoperative with respect to the cams 3 and 5 until centrifugal pressure holds the rollers securely in the cam grooves Figs. 12 and 14; or whereas I may wish to employ any other equally obvious simplification or equivalent arrangement, an example of such simplification being shown in Figures 15, 16 and 17. In Fig. 15 of the drawings each bearing 25A is similar to a large Woodruff key and is fitted into a suitably formed recess of a holder element 25E which is secured to the driven member 25. Retrograde rotation of the planet-gear carrier is prevented by means of the pawl 24F shown in Fig. 16. The pawl actuating lever 24E is hinged in the case 24 and is adjusted by means of a set-screw 24D. The ball 63C fits the annular groove of the planet-gear carrier element 63A and is associated with the lever 24E so as to cause the pawl 24F to engage one of the teeth 63B when the planet-gear carrier moves slightly into retrograde rotation. A spring is employed to normally hold the pawl 24F out of engagement with the teeth 63B.

While I have illustrated and described fair working examples of my device in this application and in the aforesaid references I do not wish to be understood as limiting myself to the specific details of construction and formation of the elements shown, as under the spirit of my invention I believe that I am entitled to employ a wide variation of detail such as may fall within the scope of the appended claims.

Having thus described my invention, what I claim as new and desire to secure by Letters Patent, is:—

1. In a power transmission device, the combination of a drive member and a driven member, a differential mechanism connecting said members possessing a weight, means to revolve said weight in proportion to the speed of the driven member, means attached to the drive member to work the weight against centrifugal resistance, a drive gear attached to the drive member, an internal driven gear attached to the driven member, a connecting gear having a series of spiral teeth meshing with teeth of the drive gear and teeth of the driven gear, and means having operative connection with the driven member through said connecting gear to work the weight whereby to vary gradually the ratio of speed transmission, and of means to control the differential mechanism.

2. In a power transmission device, the combination of a drive member and a driven member, a gear carrier free to variably rotate relative to the drive member, a spiral gear assembly associated with said members and the carrier to rotate the driven member at a variable reduction when the ratio of rotation varies between said carrier and the drive member, means to prevent retrograde rotation of said carrier, centrifugally operating weights revolved in proportion to the speed of the driven member, an internal cam attached to the gear carrier, an internal cam attached to the drive member, said weights having operative connection with the cams so as to be moved against centrifugal resistance whereby to vary said ratio.

3. In a power transmission device, the combination of a drive member and a driven member, a gear carrier free to variably rotate relative to the drive member, an internal gear attached to the driven member, a drive gear attached to the drive member, and a planet-gear journaled in said carrier in mesh with the aforesaid gears to rotate the driven member at a variable reduction when the ratio of rotation varies between said carrier and the drive member, means to prevent retrograte rotation of said carrier, a centrifugally operating weight revolved in proportion to the speed of the driven member, a cam attached to the gear carrier, an internal cam attached to the drive member, said weight having operative connection with the cams so as to be worked against centrifugal resistance whereby to vary said ratio.

4. In a power transmission device, the combination of a drive member and a driven member, a gear carrier free to variably rotate relative to the drive member, an internal gear attached to the driven member, a drive gear attached to the drive member, and a planet-gear journaled in said carrier in mesh with the aforesaid gears to rotate the driven member at a variable reduction when the ratio of rotation varies between said carrier and the drive member, means to prevent retrograde rotation of said carrier, a centrifugally operating weight revolved in proportion to the speed of the driven member, a cam attached to the drive member, a cam attached to said carrier, said weight having two operative connections with one of the cams and one operative connection with the other cam so as to be worked against centrifugal resistance whereby to vary said ratio.

5. In a power transmission device, the combination of a drive member and a driven member, a gear carrier free to variably rotate relative to the drive member, an internal gear attached to the driven member, a drive gear attached to the drive member, and a planet-gear journaled in said carrier in mesh with the aforesaid gears to rotate the driven member at a variable reduction when the ratio of rotation varies between said carrier and the drive member, means to prevent retrograde rotation of said carrier, centrifugally operating weights revolved in proportion to the speed of the driven member, rollers carrying the weights, a cam attached to said carrier, an internal cam attached to the drive member, said internal cam having a rotary groove suitably formed as a race for two or more of the rollers, and the weights otherwise having operative connection with the cams so as to be worked against centrifugal resistance whereby to vary said ratio.

6. In a power transmission device, the combination of a drive member and a driven member, a gear carrier free to variably rotate relative to the drive member, an internal gear attached to the driven member, a drive gear attached to the drive member, and a planet-gear journaled in said carrier in mesh with the aforesaid gears to rotate the driven member at a variable reduction when the ratio of rotation varies between said carrier and the drive member, means to prevent retrograde rotation of said carrier, a torque-controlled centrifugally-governed clutch means whereby to vary said ratio, said clutch means including an internal cam attached to the drive member, rollers in rolling contact with the cam, centrifugally operating weights carried on the rollers and revolved in proportion to the speed of the driven member so as to be worked against centrifugal resistance by the cam, spring means associated with the weights so that said weights are worked against spring pressure by the cam, clutching elements in connection with the weights, and a clutched member in connection with said carrier.

7. In a power transmission device, the combination of a drive member and a driven member, a gear carrier free to variably rotate relative to the drive member, a gear assembly associated with said members and the carrier to rotate the driven member at a variable reduction when the ratio of rotation varies between said carrier and the drive member, means to prevent retrograde rotation of said carrier, said gear assembly including a driven gear attached to the driven member, a drive gear attached to the drive member, a gear journaled for rotation in the gear carrier, the last named gear being in mesh with the aforesaid gears, the drive gear possessing a series of teeth containing fewer operative teeth than the series with which it meshes, and the driven gear possessing a series of internal teeth containing more operative teeth than the series with which it meshes, and of clutch means operatively connecting the driven member to the ensemble including the drive member, the gear carrier, and the gears connecting the drive member to said carrier, said clutch means possessing centrifugally operating weights revolved in proportion to the speed of the driven member and means in connection with said ensemble to move said weights against centrifugal resistance whereby to vary said ratio.

8. The combination with a drive member and a driven member, of a gear carrier free to variably rotate relative to the drive member, a gear assembly associated with said members and the carrier to rotate the driven member at a variable reduction when the ratio of rotation varies between said carrier and the drive member, means to prevent retrograde rotation of said carrier, said gear assembly including a driven gear attached to the driven member, a drive gear attached to the drive member, a gear journaled for rotation in the gear carrier, the last named gear being in mesh with the aforesaid gears, the drive gear possessing a series of teeth containing fewer operative teeth than the series with which it meshes, and the driven gear possessing a series of internal teeth containing more operative teeth than the series with which it meshes, of a drum in connection with the gear carrier, a case, brake means operable between the case and the drum, means to connect a power engaging means to said brake means so as to manually check the rotation of the gear carrier after the power has been disengaged, and three-way clutch means operatively connecting the drive member, the driven member, and the gear carrier whereby to vary said ratio.

9. In a power transmission device, the combination of a drive member and a driven member, a gear carrier free to variably rotate relative to the drive member, a gear assembly associated with said members and the carrier to rotate the driven member at a variable reduction when the ratio of rotation varies between said carrier and the drive member, means to prevent retrograde rotation of said carrier, said gear assembly including a driven gear attached to the driven member, a drive gear attached to the drive member, a gear journaled for rotation in the gear carrier, the last named gear being in mesh with the aforesaid gears, the drive gear possessing a series of teeth containing fewer operative teeth than the series with which it meshes, and the driven gear possessing a series of internal teeth containing more operative teeth than the series with which it meshes, of centrifugally operating weights free to be moved against centrifugal resistance, means to positively connect the weights to the driven member, means in connection with the drive member to move said weights against centrifugal resistance, and means in connection with the gear carrier to move the weights against centrifugal resistance whereby to vary said ratio.

10. The combination with a drive member and a driven member, of a gear carrier free to variably rotate relative to the drive member, a gear assembly associated with said members and the carrier to rotate the driven member at a variable reduction when the ratio of rotation varies between said carrier and the drive member, said gear assembly including a driven gear attached to the driven member, a drive gear attached to the drive member, a gear journaled for rotation in the gear carrier, the last named gear being in mesh with the aforesaid gears, the drive gear possessing a series of teeth containing fewer operative teeth than the series with which it meshes, and the driven gear possessing a series of internal teeth containing more operative teeth than the series with which it meshes, of clutch means operatively connecting the driven member to the ensemble including the drive member, the gear carrier, and the gears connecting the drive member to said carrier, said clutch means possessing centrifugally operating weights free to be moved against centrifugal resistance, and means in connection with said ensemble to move the weights against centrifugal resistance whereby to vary said ratio, of a case, a drum in connection with the gear carrier, and an automatically actuating brake mechanism acting between the case and the drum so as to prevent retrograde rotation of said carrier.

11. The combination with a drive member and a driven member, of a gear carrier free to variably rotate relative to the drive member, a gear assembly associated with said members and the carrier to rotate the driven member at a variable reduction when the ratio of rotation varies between said carrier and the drive member, said gear assembly including a driven gear attached to the driven member, a drive gear attached to the drive member, a gear journaled for rotation in the gear carrier, the last named gear being in mesh with the aforesaid gears, the drive gear possessing a series of teeth containing fewer operative teeth than the series with which it meshes, and the driven gear possessing a series of internal teeth containing more operative teeth than the series with which it meshes, of clutch means operatively connecting the drive member, the driven member and the gear carrier whereby to vary said ratio, a case, a drum in connection with the gear carrier, manually actuated frictional braking means operable between the case and the drum, and automatically actuating braking means acting between the case and the drum so as to prevent retrograde rotation of said carrier.

12. In a power transmission device, the combination of a drive member and a driven member, a gear carrier free to variably rotate relative to the drive member, a gear assembly associated with said members and the carrier to rotate the driven member at a variable reduction when the ratio of rotation varies between said carrier and the drive member, means to prevent retrograde rotation of said carrier, said gear assembly including a driven gear attached to the driven member, a drive gear attached to the drive member, a gear journaled for rotation in the gear carrier, the last named gear being in mesh with the aforesaid gears, the drive gear possessing a series of teeth containing fewer operative teeth than the series with which it meshes, and the driven gear possessing a series of internal teeth containing more operative teeth than the series with which it meshes, of three-way clutch means operatively connecting the drive member, the driven member and the gear carrier, and a second clutch means operatively connecting the drive member to the driven member and the gear carrier, and a second clutch means operatively connecting the drive member to the driven member, said second clutch means including a centrifugally operating weight free to be moved against centrifugal resistance, and means in connection with the drive member to move the weight against centrifugal resistance whereby to vary said ratio.

13. In a power transmission device, the combination of a drive member and a driven member, a gear carrier free to variably rotate relative to the drive member, a gear assembly associated with said members and the carrier to rotate the driven member at a variable reduction when the ratio of rotation varies between said carrier and the drive member, means to prevent retrograde rotation of said carrier, said gear assembly including a driven gear attached to the driven member, a drive gear attached to the drive member, a gear journaled for rotation in the gear carrier, the last named gear being in mesh with the aforesaid gears, the drive gear possessing a series of teeth containing fewer operative teeth than the series with which it meshes, and the driven gear possessing a series of internal teeth containing more operative teeth than the series with which it meshes, of clutch means operatively connecting the driven member to the ensemble including the drive member, the gear carrier, and the gears connecting the drive member to said carrier, and of a second clutch means operatively connecting the drive member to the driven member including a centrifugally operating weight revolved in proportion to the speed of the driven member, and an internal cam attached to the drive element to move the weight against centrifugal resistance whereby to vary said ratio.

14. In a power transmission device, the combination of a drive member and a driven member, of a differential mechanism connecting said members including a revolving weight, a spring and means to move the weight against centrifugal resistance and against spring pressure, and a gear assembly having a driven gear attached to the driven member, a drive gear attached to the drive member, a gear carrier rotatable on the axis of one of the members, a pair of spiral gears journaled for rotation in the gear carrier, the pair of gears being in mesh with the drive gear and the driven gear whereby to vary the ratio of speed transmission, of a case, and of lock mechanism operable between the case and the differential mechanism to control the latter.

15. In a power transmission device, the combination with a drive member and a driven member, of a differential mechanism connecting the members and possessing an apparatus which possesses a spring and a centrifugally operating weight which is free to be moved through pressure from the spring, and oppositely moved through the rotation of the drive member, said apparatus having operative connection with the driven member through a pair of spiral planet gears whereby to vary the speed ratios between said members, and of means to control the differential mechanism.

16. In a power transmission device, the combination of a drive member and a driven member, a differential mechanism connecting the members and possessing an apparatus which possesses a spring and a centrifugally operating weight which is free to be moved through pressure from the spring and oppositely moved through the rotation of the drive member, a cam attached to the drive member, gears attached to said members, and means in operative connection with the apparatus to work the weight having operative connection with said members through a pair of spiral planet gears, the latter connecting the gears attached to said members whereby to vary the ratio of speed transmission, and of means to control the differential mechanism.

17. In a power transmission device, the combination of a drive member and a driven member, a differential mechanism connecting said members and possessing a weight, means to revolve said weight in proportion to the speed of the driven member, a spring and means attached to the drive member to work the weight against centrifugal resistance and against spring pressure, a drive gear attached to the drive member, an internal driven gear attached to the driven member, a pair of planet-gears in mesh with the aforesaid gears, and means having operative connection with the driven member through said pair of gears to work the weight whereby to vary the ratio of speed transmission, and of means to control the differential mechanism.

18. In a power transmission device, the combination of a drive member and a driven member, a differential mechanism connecting said members possessing centrifugally operating weights, means to revolve said weights in proportion to the speed of the driven member, a cam possessing a rotary groove to work the weights against centrifugal resistance through rotation of the drive member, rollers carrying said weights and rolling in said groove, a planetary spiral gear-assembly connecting said members, and a cam having operative connection with the driven member through the planet-gear to work the weight whereby to vary the ratio of speed transmission.

19. In a power transmission device, the combination of a drive member and a driven member, a spiral planetary gear-assembly connecting said members, automatically actuating clutch means operatively connecting said members and the gear-assembly whereby to vary the ratio of speed transmission, a case, a drum in connection with the gear-assembly, brake means operable between the case and the drum, a hub adapted to rotate with the planet-gear carrier, and automatically actuating clutch mechanism operatively connected to the brake means and adapted to clutch the hub to actuate the brake means whereby to prevent retrograde rotation of the planet-gear carrier.

20. In a power transmission device, the combination of a drive member and a driven member, a gear carrier rotatable on the axis of one of said members, a train of spiral gears connecting said members having one of the gears journaled for rotation in the gear carrier, a cam attached to the gear carrier, an internal cam attached to the drive member, rollers, a centrifugally operating weight carried on said rollers and interposed between the cams so that a roller rolls under centrifugal pressure on each cam, means to revolve the weight in proportion to the speed of the driven member whereby to govern the speed ratios between the members, and means to prevent retrograde rotation of the gear carrier.

Signed at Lansing, in the county of Ingham and State of Michigan, this 2d day of October, 1930.

GAIL H. HINES.